(12) United States Patent
Suzuki (10) Patent No.: US 8,197,107 B2
(45) Date of Patent: Jun. 12, 2012

(54) HOUSING STRUCTURE OF DOOR MIRROR

(75) Inventor: Kentaro Suzuki, Fujieda (JP)

(73) Assignee: Murakami Corporation, Shizuoka (JP)

( * ) Notice: Subject to any disclaimer, the term of this patent is extended or adjusted under 35 U.S.C. 154(b) by 6 days.

(21) Appl. No.: 12/939,513

(22) Filed: Nov. 4, 2010

(65) Prior Publication Data

US 2011/0205649 A1 Aug. 25, 2011

(30) Foreign Application Priority Data

Feb. 25, 2010 (JP) ................................ 2010-040645

(51) Int. Cl.
*B60Q 1/00* (2006.01)
(52) U.S. Cl. ........ 362/501; 362/494; 362/492; 362/135; 362/544
(58) Field of Classification Search .................. 362/501, 362/492, 494, 135, 140–142, 540, 541, 544–547, 362/516–518, 464, 234, 241, 251, 503, 506, 362/459; 359/841, 843, 874, 838, 876, 877, 359/881, 871; 248/480, 487; 340/468; 296/1.11
See application file for complete search history.

(56) References Cited

U.S. PATENT DOCUMENTS

| | | | | |
|---|---|---|---|---|
| 4,812,955 A * | 3/1989 | Beswick et al. | ............... | 362/240 |
| 6,039,448 A * | 3/2000 | Oprea | ........................... | 359/850 |
| 6,142,656 A * | 11/2000 | Kurth | ............................. | 362/494 |
| 6,250,783 B1 * | 6/2001 | Stidham et al. | ................ | 362/494 |
| 6,511,192 B1 * | 1/2003 | Henion et al. | ................. | 359/864 |
| 6,811,288 B2 * | 11/2004 | Hutzel | ............................. | 362/494 |
| 7,008,089 B1 * | 3/2006 | McCloy et al. | ................ | 362/494 |
| 2005/0225994 A1 * | 10/2005 | Rodriguez Barros et al. | ........................... | 362/494 |

FOREIGN PATENT DOCUMENTS

JP 2002-96684 4/2002

* cited by examiner

*Primary Examiner* — Anabel Ton
*Assistant Examiner* — Danielle Allen
(74) *Attorney, Agent, or Firm* — Greenblum & Bernstein P.L.C.

(57) ABSTRACT

The present invention provides a housing structure of a door mirror in which a fixed-side housing portion is reliably crimped to a fixing-side housing portion on the surface side of a housing. In the housing structure of a door mirror, a boss portion and a contact piece are located on the deeper side than first and second butting portions located on the surface side, and a projection portion is located farther than a screwing portion in a positional relationship in the vertical direction (an arrow Y direction) with respect to a horizontal plane passing through the first butting portion. Therefore, when the boss portion (first mounting portion) of an upper housing (fixing-side housing portion) and the contact piece (second mounting portion) of a lamp assy (fixed-side housing portion) are fixed by a screw, a screw tightening force can be concentrated on the projection portion as shown by an arrow A, and this force can be made to act on the first and second butting portions as shown by an arrow B.

4 Claims, 6 Drawing Sheets

HOUSING STRUCTURE OF DOOR MIRROR

CROSS-REFERENCE TO RELATED APPLICATION

The disclosure of Japanese Patent Application No. JP2010-040645 filed on Feb. 25, 2010 including the specification, drawings and abstract is incorporated herein by reference in its entirety.

BACKGROUND OF THE INVENTION

1. Field of the Invention

The present invention particularly relates to a housing structure of a door mirror for an automobile, provided with a side-turn lamp.

2. Related Background of the Invention

Prior-art technologies of this field include Japanese Patent Laid-Open No. 2002-96684. A door mirror described in this Gazette is provided with a housing in the shape of a curved container whose rear side is opened. In this housing, a laterally long notch portion extending inward from an outer-side end in the car-width direction is formed. Into this notch portion, a side-turn lamp in the laterally long shape is inserted. A lens is fixed to a lens base of this side-turn lamp by welding or the like, and in an internal space formed by the lens base and the lens, LEDs are aligned. The side-turn lamp is fixed on the inner side of the housing by a screw.

SUMMARY OF THE INVENTION

In the prior-art housing structure of a door mirror described above, the side-turn lamp inserted into the notch portion of the housing is fixed by the screw so as to be flush with the surface of the housing, and an edge portion forming the notch portion, of the housing and an edge portion of the side-turn lamp are adapted to be butted to each other. However, due to distortion, contraction error and the like after molding of the housing or the side-turn lamp, there have been problems that the side-turn lamp is not reliably crimped onto the housing, and a gap can be easily generated at the butted portion between the housing and the side-turn lamp.

The present invention has an object to provide a housing structure of a door mirror for an automobile in which a fixed-side housing portion is reliably crimped to a fixing-side housing portion on the surface side of the housing.

According to the present invention, in a door mirror for an automobile having a cup-shaped housing, the housing comprises: a fixing-side housing portion in which a first butting portion located on the surface side and a first mounting portion located on the deeper side than the first butting portion are provided; and a fixed-side housing portion in which a second butting portion located on the surface side and brought into contact with the first butting portion and a second mounting portion to be crimped to the first mounting portion by a screw are provided, wherein in the first mounting portion, a screwing portion into which the screw is screwed in a substantially horizontal direction is provided at a position spaced in the vertical direction from a horizontal plane passing through the first butting portion; and the first mounting portion and the second mounting portion are crimped by the screw through a projection portion, and this projection portion is located farther than the screwing portion from the horizontal plane in the vertical direction.

In this housing structure of a door mirror, the first and second mounting portions are located on the deeper side than the first and second butting portions located on the surface side, and the projection portion is located farther than the screwing portion in a positional relationship in the vertical direction with respect to the horizontal plane passing through the first butting portion. Therefore, if the first mounting portion of the fixing-side housing portion and the second mounting portion of the fixed-side housing portion are to be fixed together by a screw, a screw tightening force can be concentrated to the projection portion, and this force can be made to act on the first and second butting portions. As a result, the larger the screw tightening amount is made, the larger the screw tightening force acting on the projection portion becomes, and a crimping force between the first butting portion and the second butting portion can be increased accordingly. Therefore, the first butting portion of the fixing-side housing portion and the second butting portion of the fixed-side housing portion can be reliably crimped, and a gap is hardly generated at this butted portion. As a result, an appearance quality on the surface of the housing of the door mirror can be improved. Moreover, since the fixing-side housing portion and the fixed-side housing portion can be firmly connected to each other on the surface side, an integral feeling between the fixing-side housing portion and the fixed-side housing is improved, and even though the housing is divided, an excellent effect that increased rigidity of the housing can be realized is obtained.

Also, it is preferable that the housing is provided with an upper housing located on the upper side, a lower housing located on the lower side, and a lamp assy located between the upper housing and the lower housing, and the fixing-side housing portion is the lower housing and the fixed-side housing portion is the lamp assy.

Such configuration enables increased rigidity of connection between the lower housing and the lamp assy in the housing divided into three parts, that is, the upper housing, the lower housing and the lamp assy.

Also, it is preferable that the housing is provided with the upper housing located on the upper side, the lower housing located on the lower side, and the lamp assy located between the upper housing and the lower housing, and the fixing-side housing portion is the upper housing and the fixed-side housing portion is the lamp assy.

Such configuration enables increased rigidity of connection between the upper housing and the lamp assy in the housing divided into three parts, that is, the upper housing, the lower housing, and the lamp assy.

Also, it is preferable that a projection portion is formed on either one of the first butting portion and the second butting portion.

With such configuration, a crimping force of the second butting portion to the first butting portion can be increased, and moreover, a gap corresponding to the height of the projection portion can be generated on the surface of the housing in the horizontal direction between the fixing-side housing portion and the fixed-side housing portion, and this gap can be used as design.

According to the present invention, on the surface side of the housing, the fixed-side housing portion can be reliably crimped to the fixing-side housing portion.

DESCRIPTION OF THE PREFERRED EMBODIMENTS

A preferred embodiment of a housing structure of a door mirror according to the present invention will be described below in detail referring to the attached drawings.

Figure 1:
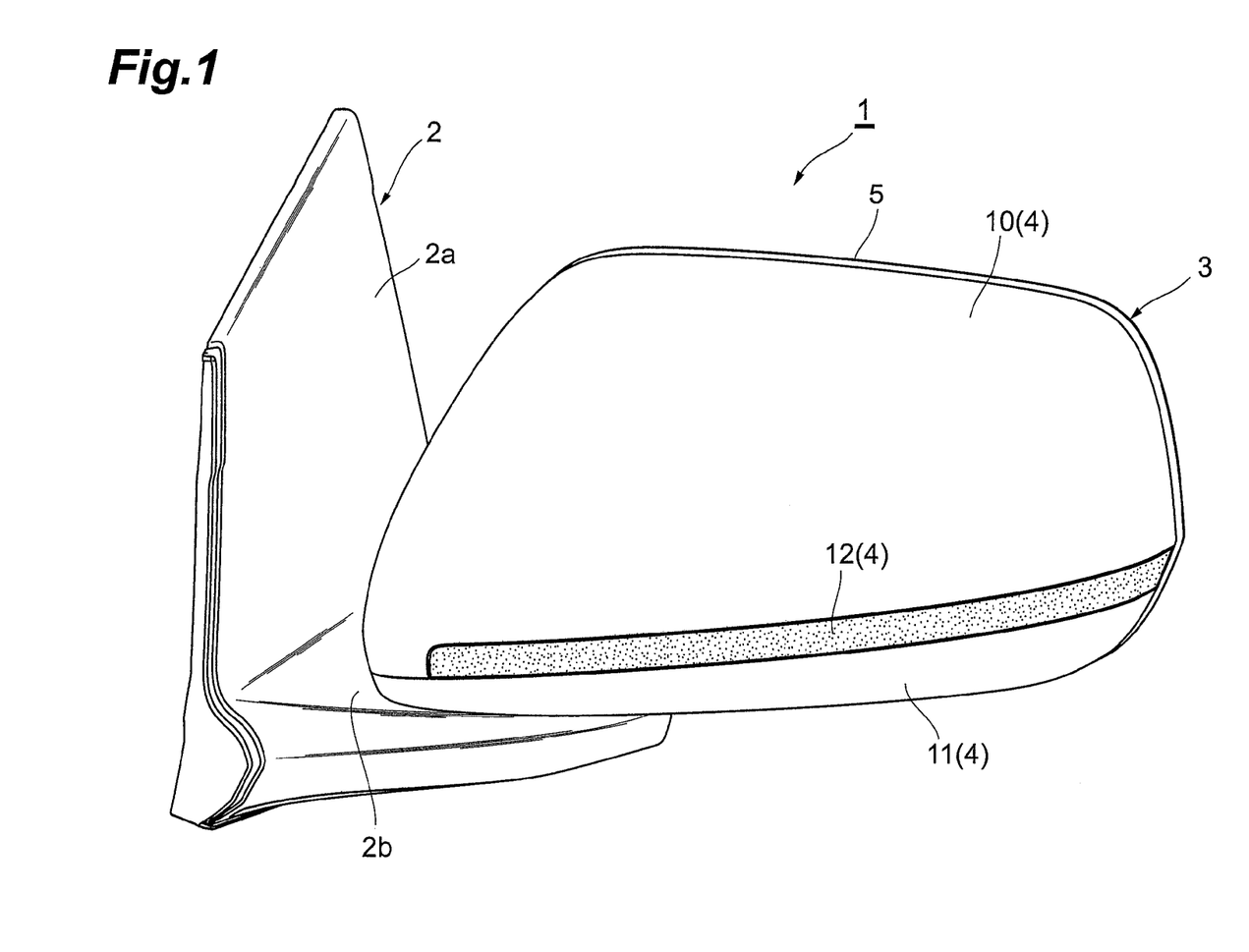
FIG. 1 is a perspective view illustrating an embodiment of a housing structure of a door mirror according to the present invention.

As shown in FIG. 1, a door mirror 1 for an automobile includes a door-mirror base 2 made of resin and having a pedestal portion 2b extending horizontally from a base portion 2a bolted to a front door and a door-mirror main body 3 mounted to the pedestal portion 2b of the door-mirror base 2. This door-mirror main body 3 includes a shaft whose lower end is fixed to the pedestal portion 2b of the door-mirror base 2 by a screw, a frame made of resin that fixes a tilting mechanism of a mirror and the like and is rotatable with respect to the shaft, a cup-shaped housing 4 made of resin to which the frame is fixed, and a visor 5 made of resin fitted to the housing 4 around an opening of the housing 4 so as to surround the mirror.

Figure 2:
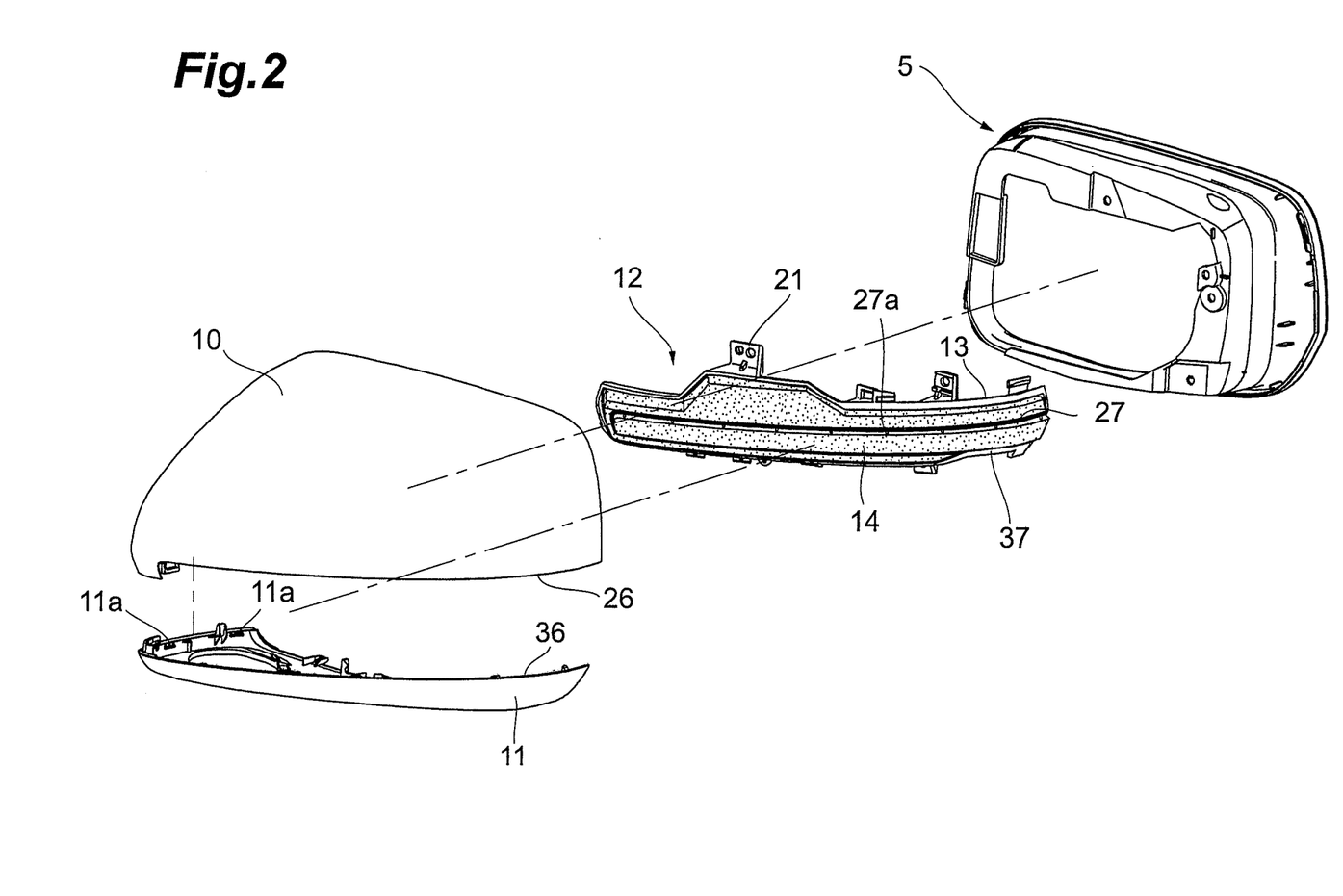
FIG. 2 is an exploded perspective view illustrating a housing and a visor.
Figure 3:
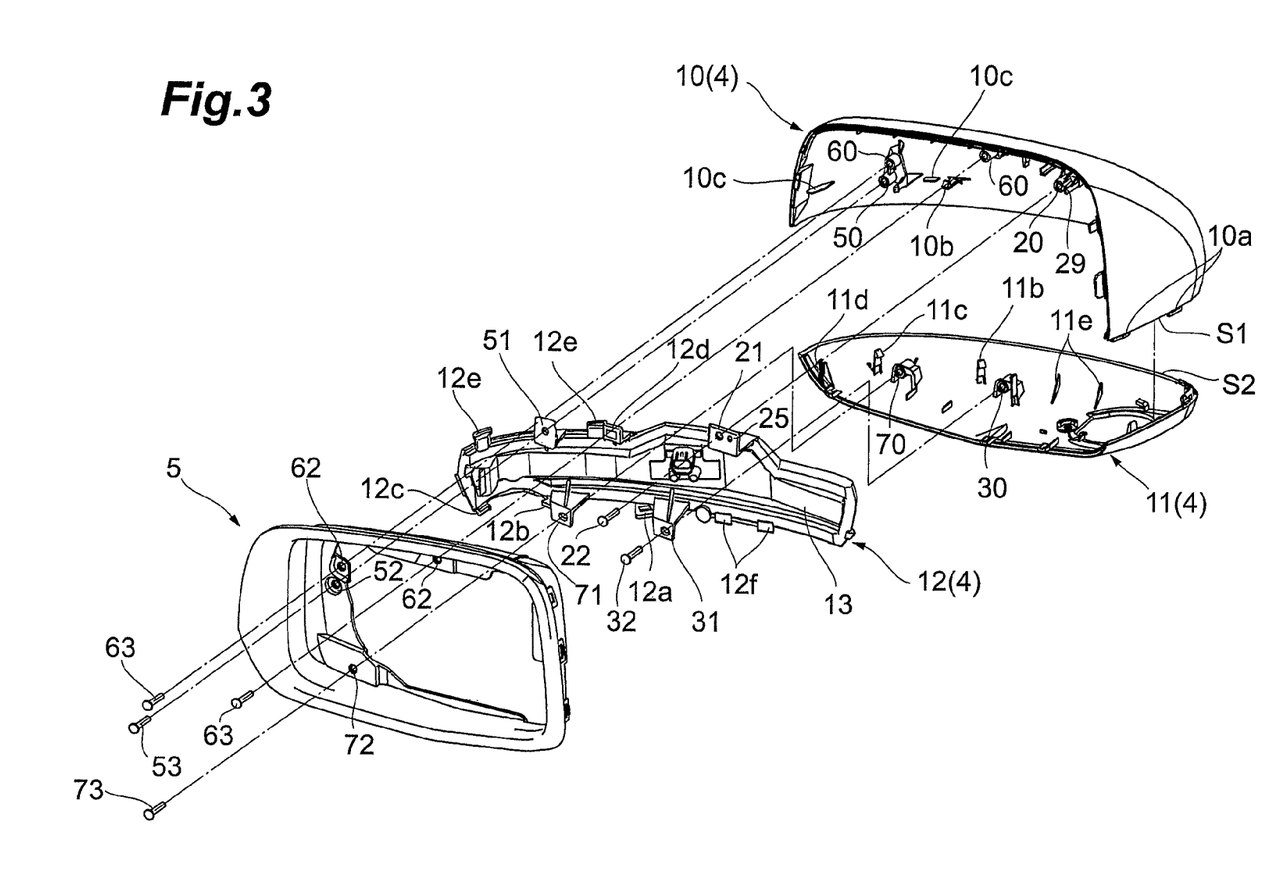
FIG. 3 is an exploded perspective view illustrating the housing and the visor.

As shown in FIGS. 2 and 3, the housing 4 includes an upper housing 10 located on the upper side, a lower housing 11 located on the lower side, and a lamp assy 12 constituting a side-turn lamp and is divided into three parts. By means of this divided structure, color combination of the upper housing 10 and the lower housing 11 can be easily made different. Also, the lamp assy 12 has a lens base 13 fixed to the upper housing 10 and the lower housing 11, a lens portion 14 fixed to this lens base 13 by welding or the like, and LEDs (not shown) aligned in the internal space formed by the lens base 13 and the lens portion 14.

From a divided face S1 on the lower end of the upper housing 10, a claw 10a protrudes, and on the inner face of the lower housing 11, a hook portion 11a located below a divided face S2 of the lower housing 11 and fitted with the claw 10a is provided. Only by hooking the claw 10a to the hook portion 11a, the lower housing 11 can be easily connected to the upper housing 10. Moreover, on the inner face of the lower housing 11, claw pieces 11b, 11c, and 11d protruding in the vertical direction are provided, and on the lower side of the lamp assy 12, locking pieces 12a, 12b, and 12c protruding in the horizontal direction are provided. When distal end portions of the respective claw pieces 11b, 11c, and 11d are hooked by the locking pieces 12a, 12b, and 12c, the lamp assy 12 is locked by the lower housing 11, and separation between the lamp assy 12 and the lower housing 11 in the vertical direction is prevented.

On the inner face of the lower housing 11, a triangular rib 11e is installed upright, while on the lower side of the lamp assy 12, a receiving face 12f extending in the vertical direction is formed, and when the receiving face 12f is brought into contact with the upright face of the rib 11e, the lamp assy 12 is pressed onto the lower housing 11 in the horizontal direction.

Also, on the inner face of the upper housing 10, a claw piece 10b protruding in the horizontal direction is provided, while on the upper side of the lamp assy 12, a locking piece 12d protruding in the vertical direction is provided. By hooking the distal end portion of the claw piece 10b by the locking piece 12d, the lamp assy 12 is locked by the upper housing 10, and removal of the lamp assy 12 from the upper housing 10 in the horizontal direction is prevented.

Moreover, an L-shaped pressing claw 12e protruding in the vertical direction is provided on the upper side of the lamp assy 12, while a hooking piece 10c protruding in the horizontal direction is provided on the inner face of the upper housing 10. Then, by hooking the distal end portion of the pressing claw 12e by the hooking piece 10c, separation between the lamp assy 12 and the upper housing 10 in the vertical direction is prevented.

Figure 4:
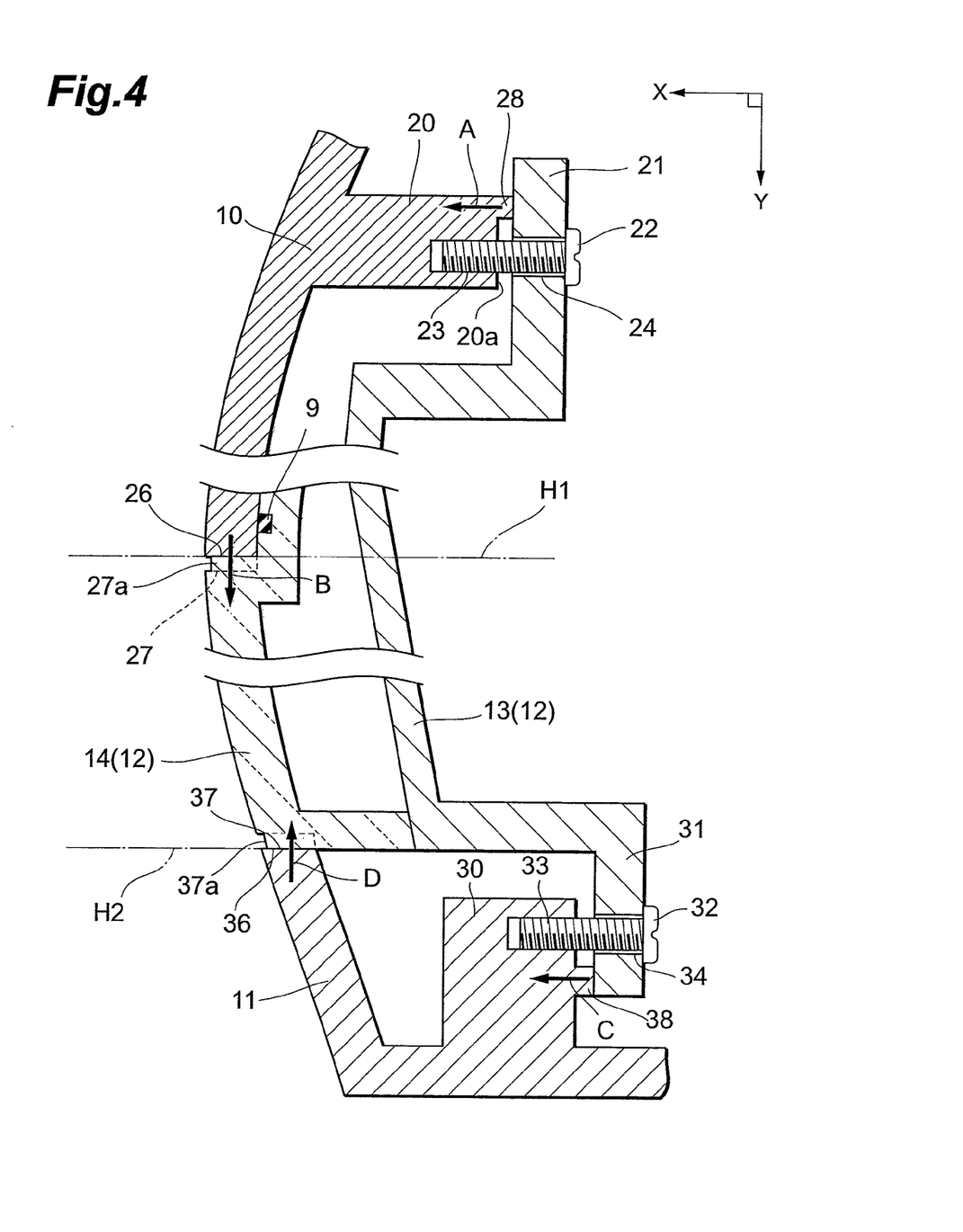
FIG. 4 is an enlarged sectional view of an essential part of the housing structure of the door mirror according to the present invention.
Figure 5:
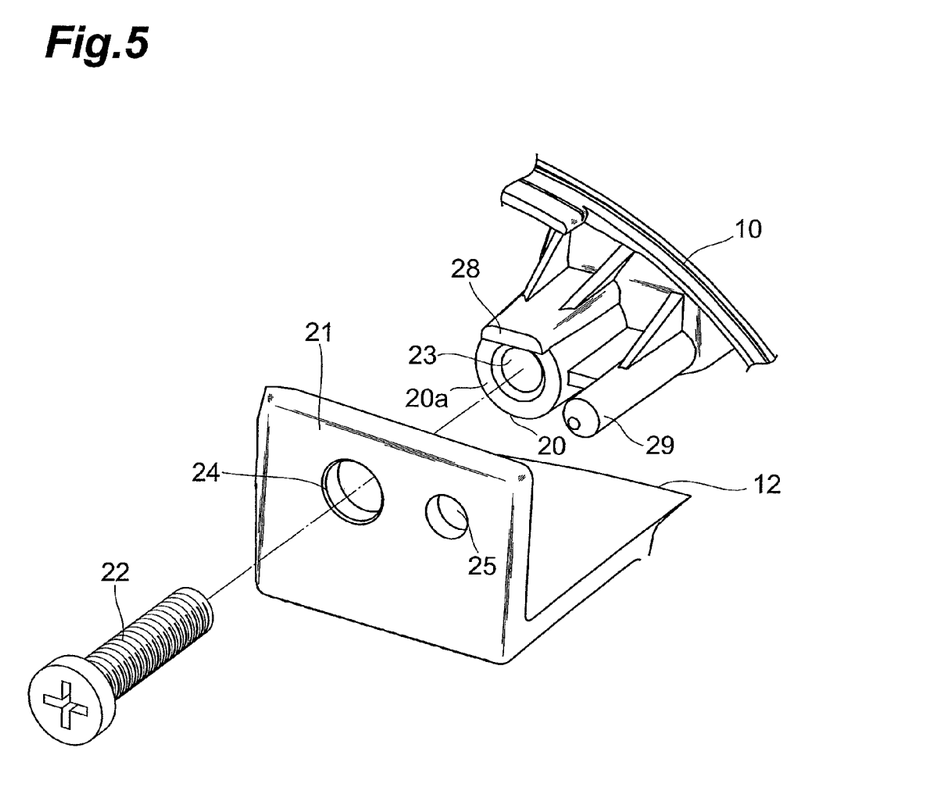
FIG. 5 is a perspective view illustrating the essential part in an enlarged manner.

As shown in FIGS. 3 to 5, a boss portion (first mounting portion) 20 protruding in the horizontal direction is provided on the inner face of the upper housing 10, while on the upper side of the lens base 13 of the lamp assy 12, a contact piece (second mounting portion) 21 extending in the vertical direction and brought into contact with a free end 20a of the boss portion 20 is provided. Moreover, in this boss portion 20, a screwing portion 23 into which a screw 22 is screwed in the horizontal direction (an arrow X direction) is provided, while in the contact piece 21, a screw through hole 24 through which the screw 22 penetrates is formed.

On the upper housing 10, a positioning pin 29 adjacent to the boss portion 20 and protruding in the horizontal direction is provided, and the insertion of this positioning pin 29 into a pin insertion hole 25 formed in the contact piece 21 achieves positioning of the lamp assy 12 to the upper housing 10. Moreover, on the surface side of the upper housing 10, a first butting portion 26 extending in the horizontal direction (the arrow X direction) and butted to the lens portion 14 of the lamp assy 12 is formed.

Figure 6:
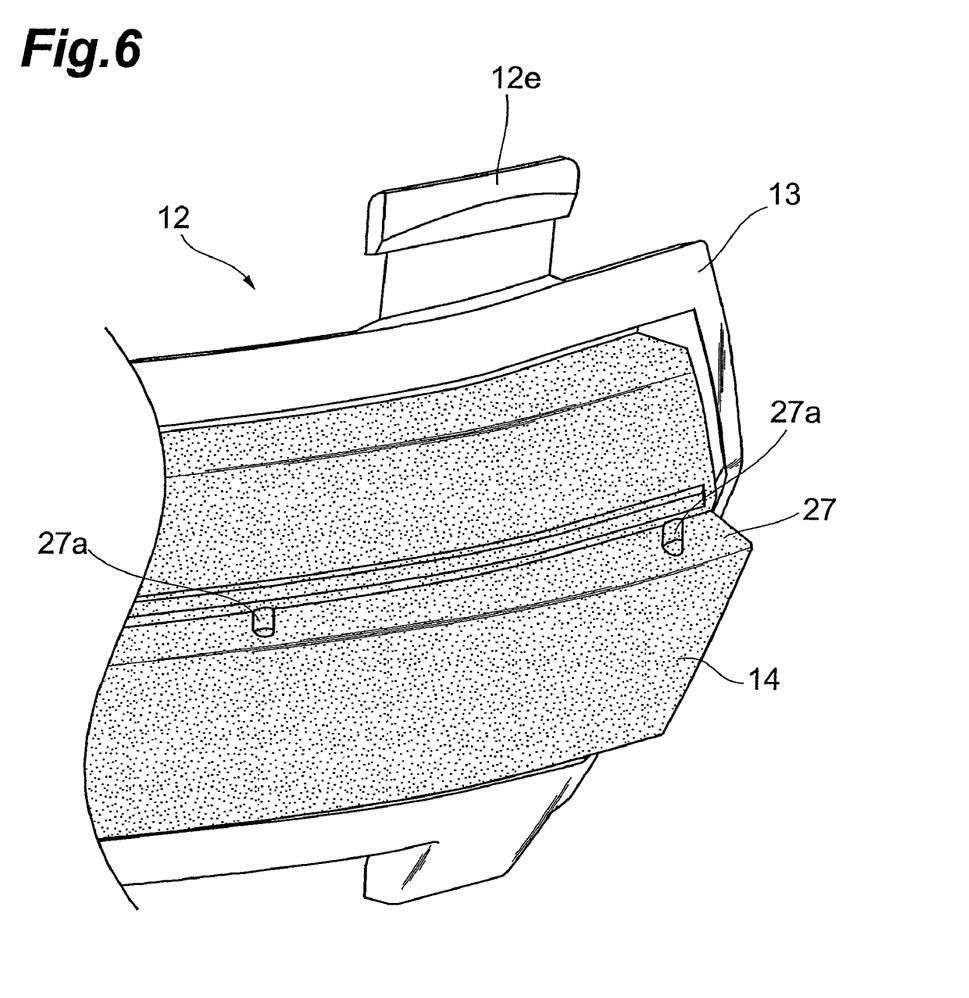
FIG. 6 is an enlarged perspective view of an essential part of a lamp assy.

This first butting portion 26 is brought into contact with a step-like second butting portion 27 located on the surface side of the lamp assy 12 and extending in the horizontal direction, and in this second butting portion 27, projection portions 27a are integrally formed at an equal interval (See FIG. 6). The screwing portion 23 of the upper housing 10 is disposed spaced from a horizontal plane H1 passing through the first butting portion 26 in the vertical direction (an arrow Y direction), and a projection portion 28 integral with the boss portion 20 protrudes on the free end 20a side of the boss portion 20. To this projection portion 28, the contact piece (second mounting portion) 21 is crimped, and this projection portion 28 is located farther than the screwing portion 23 from the horizontal plane H1 in the vertical direction (the arrow Y direction).

As shown in FIG. 4, in the housing structure of the door mirror 1, the boss portion 20 and the contact piece 21 are located on the deeper side than the first and second butting portions 26 and 27 located on the surface side, and the projection portion 28 is located farther than the screwing portion 23 in a positional relationship in the vertical direction (the arrow Y direction) with respect to the horizontal plane H1 passing through the first butting portion 26. Therefore, when the boss portion (first mounting portion) 20 of the upper housing (fixing-side housing portion) 10 and the contact piece (second mounting portion) 21 of the lamp assy (fixed-side housing portion) 12 are to be fixed together by the screw 22, a screw tightening force can be concentrated to the projection portion 28 as shown by an arrow A, and this force can be made to act on the first and second butting portions 26 and 27 as shown by an arrow B.

As a result, the larger the tightening amount of the screw 22 is made, the larger the screw tightening force acting on the projection portion 28 becomes, and accordingly, the crimping force between the first butting portion 26 and the second butting portion 27 can be increased. Therefore, the first butting portion 26 of the upper housing 10 and the second butting portion 27 of the lamp assy 12 can be reliably crimped, and a gap is hardly generated in this butted portion. As a result, an appearance quality is improved on the surface of the housing 4 of the door mirror 1. Moreover, since the upper housing 10 and the lamp assy 12 can be firmly connected to each other on the surface side, an integral feeling between the upper housing 10 and the lamp assy 12 can be improved, and even though the housing 4 is divided into three parts, an excellent effect that increased rigidity of the housing 4 can be realized is obtained.

Moreover, since the projection portions 27a (See FIG. 6) are integrally formed at an equal interval on the second butting portion 27, the crimping force of the second butting portion 27 to the first butting portion 26 can be improved. Moreover, a gap corresponding to the height of the projection portion 27a can be generated on the surface of the housing 4 in the horizontal direction between the upper housing 10 and the lamp assy 12, and this gap can be used as design. Reference numeral 9 denotes packing.

Subsequently, a connection relationship between the lower housing 11 and the lamp assy 12 on the surface of the housing 4 will be described, but since it is the same as the connection relationship between the upper housing 10 and the lamp assy 12, the description will be made briefly.

As shown in FIG. 4, in the housing structure of the door mirror 1, a boss portion 30 provided on the lower housing 11 and a contact piece 31 provided on the lamp assy 12 are located on the deeper side than first and second butting portions 36 and 37 located on the surface side, and a projection portion 38 is located farther than the screwing portion 33 in the positional relationship in the vertical direction (the arrow Y direction) with respect to a horizontal plane H2 passing through the first butting portion 36. Therefore, when the boss portion (first mounting portion) 30 of the lower housing (fixing-side housing portion) 11 and the contact piece (second mounting portion) 31 of the lamp assy (fixed-side housing portion) 12 are fixed by a screw 32, a screw tightening force can be concentrated to the projection portion 38 as shown by an arrow C, and this force can be made to act on the first and second butting portions 36 and 37 as shown by an arrow D. Also, on the second butting portion 37, projection portions 37a (See FIG. 4) similar to the above-described projection portion 27a are formed at an equal interval.

As a result, the larger the tightening amount of the screw 32 is made, the larger the screw tightening force acting on the projection portion 38 becomes, and accordingly, the crimping force between the first butting portion 36 and the second butting portion 37 can be increased. Therefore, the first butting portion 36 of the lower housing 11 and the second butting portion 37 of the lamp assy 12 can be reliably crimped, and a gap is hardly generated in this butted portion. As a result, an appearance quality is improved on the surface of the housing 4 of the door mirror 1. Moreover, since the lower housing 11 and the lamp assy 12 can be firmly connected to each other on the surface side, an integral feeling between the lower housing 11 and the lamp assy 12 can be improved, and even though the housing 4 is divided into three parts, an excellent effect that increased rigidity of the housing 4 can be realized is obtained.

As shown in FIGS. 2 and 3, in the housing 4 assembled by the upper housing 10, the lower housing 11, and the lamp assy 12, a visor 5 made of resin is fitted through an opening edge, and whereby integral feeling of the housing 4 constituted by the upper housing 10, the lower housing 11, and the lamp assy 12 is improved.

On the upper housing 10, a boss portion 50 is provided, on a lamp assy 12, a contact piece 51 brought into contact with a free end of the boss portion 50 is provided, in the visor 5, a screw through hole 52 is provided, and the boss portion 50, the contact piece 51, and the visor 5 are connected by a screw 53. On the upper housing 10, a boss portion 60 is provided, on the visor 5, a screw through hole 62 is provided, and the boss portion 60 and the visor 5 are connected by a screw 63. On the lower housing 11, a boss portion 70 is provided, on the lamp assy 12, a contact piece 71 brought into contact with a free end of the boss portion 70 is provided, on the visor 5, a screw through hole 72 is provided, and the boss portion 70, the contact piece 71, and the visor 5 are connected by a screw 73.

It is needless to say that the present invention is not limited to the above-described embodiments. For example, the projection portions 28 and 38 may be formed on the lamp assy 12 side. The projection portion 27a may be formed on the upper housing 10 side and the projection portion 37a may be formed on the lower housing 11 side.

EXPLANATION OF REFERENCE NUMERALS 1 door mirror
4 housing
10 upper housing (fixing-side housing portion)
11 lower housing (fixing-side housing portion)
12 lamp assy (fixed-side housing portion)
20, 30 boss portion (first mounting portion)
21, 31 contact piece (second mounting portion)
22, 32 screw
23, 33 screwing portion
26, 36 first butting portion
27, 37 second butting portion
27a, 37a projection portion
28, 38 projection portion
H1, H2 horizontal plane

What is claimed is:

1. A housing structure of a door mirror for an automobile, the housing structure comprising:
    a cup shaped housing having first and second housing portions;
    the first housing portion having a first butting portion provided on an outer edge surface side of the first housing portion and a first mounting portion provided on an inner surface of the first housing portion, the first mounting portion having a boss that receives a screw and a boss projection portion formed at a free end of the boss; and
    the second housing portion having a second butting portion provided on an outer edge surface side of the second housing portion and contacting the first butting portion of the first housing portion, and the second housing portion having a second mounting portion provided opposite the first mounting portion of the first housing portion so as to be coupled to the first mounting portion by the screw, wherein
    the boss of the first mounting portion is provided with a screwing portion into which the screw is screwable in a substantially horizontal direction at a position spaced in a vertical direction from a horizontal plane passing through the first butting portion; and
    the first mounting portion and the second mounting portion are coupled by the screw through the boss projection portion, wherein the boss projection portion is located farther from the horizontal plane in the vertical direction than the screwing portion.

2. The housing structure of a door mirror according to claim 1, wherein the first housing portion comprises an upper housing located on the upper side of the cup-shaped housing and a lower housing located on the lower side of the cup-shaped housing, and the second housing portion comprising a lamp assembly located between the upper housing and the lower housing of the first housing portion.

3. The housing structure of a door mirror according to claim 2, wherein at least one of the upper housing and the lower housing defines a fixing-side housing portion, and wherein the lamp assembly defines a fixed-side housing portion.

4. The housing structure of a door mirror according to claim 1, wherein
a butting projection portion is formed on either one of the first butting portion and the second butting portion.

* * * * *